United States Patent [19]

Hall

[11] Patent Number: 5,007,060

[45] Date of Patent: Apr. 9, 1991

[54] LINEAR LASER WITH TWO-SWEPT FREQUENCIES OF CONTROLLED SPLITTING

[75] Inventor: David B. Hall, La Crescenta, Calif.

[73] Assignee: Litton Systems, Inc., Beverly Hills, Calif.

[21] Appl. No.: 389,370

[22] Filed: Aug. 1, 1989

[51] Int. Cl.⁵ .............................................. H01S 3/10
[52] U.S. Cl. ...................................... 372/23; 372/105
[58] Field of Search ...................... 372/23, 105, 20, 24

[56] References Cited

U.S. PATENT DOCUMENTS

| | | | |
|---|---|---|---|
| 3,382,758 | 5/1968 | Wang | 88/14 |
| 3,965,440 | 6/1976 | Graves | 372/20 |
| 4,213,705 | 7/1980 | Sanders | 356/350 |
| 4,637,027 | 1/1987 | Shirasaki et al. | 372/23 |

OTHER PUBLICATIONS

Hecht and Zajac, *Optics*, Addison-Wesley, Reading, Mass., 1979, pp. 261-263.
A. Yariv, Introduction to Optical Electronics, 1976, pp. 231-237.

*Primary Examiner*—Frank Gonzalez
*Assistant Examiner*—Susan S. Morse
*Attorney, Agent, or Firm*—Poms, Smith, Lade & Rose

[57] ABSTRACT

A linear laser having a dual frequency output is shown where the output frequencies may be varied while maintaining a constant frequency separation. The laser includes a first fully reflective mirror spaced apart from a second partially reflective mirror defining a resonant cavity, a non-reciprocal element disposed within the cavity between the two mirrors, a magnetic field forming device at the non-reciprocal element and means for varying the resonant frequency of the cavity.

16 Claims, 2 Drawing Sheets

LINEAR LASER WITH TWO-SWEPT FREQUENCIES OF CONTROLLED SPLITTING

BACKGROUND ART

The present invention is directed to lasers and, more particularly, to linear lasers having a dual frequency coherent output.

In a number of applications it is desirable to measure various optical characteristics of an apparatus under study. In the ring laser art, for example, practitioners commonly measure the spectral linewidth of the resonant cavity forming the laser. That is, a measurement of the range of frequencies which can resonate or generate coherent radiation within the ring laser cavity The linewidths of other types of optical devices, such as linear laser cavities and etalons may also be of interest. Previously, the linewidths of resonant cavities have been determined according to conventional techniques such as the fast-finesse method and the ring-down method. Both of these procedures, however, suffer from inaccuracies resulting from several empirical measurements required by the processes.

A simpler and more accurate method of measuring cavity linewidth is disclosed in a co-pending patent application, Ser. No. 7/199,858, filed May 27, 1988, entitled "Multiple Input Source Technique For Deriving Cavity Line Width" which has also been assigned to Litton Systems, Inc. In accordance with the procedure disclosed in this co-pending application, the linewidth of a resonant cavity under study is determined by injecting a coherent beam containing two separate frequencies into the cavity under study and periodically varying the two frequencies while maintaining the separation between the frequencies a constant. An optical output from the cavity under study is then displayed as a function of intensity and frequency to provide a characteristic curve from which the cavity linewidth can be easily determined.

Conventional dual frequency lasers, such as Zeeman-effect lasers, are not easily adapted to the above-described dual frequency linewidth measurement technique since the separation of the two frequencies in the output beam of a Zeeman laser is normally dependent upon the actual value of the two output frequencies. As the two frequencies of the Zeeman laser are periodically varied or swept in accordance with the dual frequency measurement technique, the separation between the frequencies varies rather than remaining constant. Linear lasers providing a single frequency output are therefore typically employed in this technique and additional optical elements, such as a Pockels cell, are used to obtain a dual frequency beam of coherent radiation. Accordingly, there exists a need for a simpler method and apparatus to provide a dual frequency coherent output in which the two frequencies can be varied while maintaining the separation between the frequencies at a constant. The present invention fulfills this need.

DISCLOSURE OF INVENTION

In general terms, the present invention provides a method and apparatus for measuring the linewidth of a resonant cavity that is more accurate than many conventional processes while requiring less complex measuring equipment. The apparatus of the present invention provides a unitary linear laser having a dual frequency output beam which may be varied or swept while maintaining a constant separation between the two frequencies.

More particularly, the dual frequency laser apparatus of the present invention includes a linear resonant cavity formed by a fully reflective first mirror and a partially reflective second mirror spaced apart from and parallel to the first mirror, a non-reciprocal optical element, such as a Faraday rotator, disposed within the cavity and a means for forming a magnetic field at the anisotropic element. In one presently preferred embodiment of the apparatus, this magnetic field is generated by an electromagnet which permits a variation or tuning of the frequency separation to achieve optimum use in the measurement process of the present invention. A permanent magnetic structure, however, may also be employed to supplement the field of the electromagnet. To avoid additional unwanted mode resonances due to etaloning, the anisotropic element within the cavity is oriented for a non-normal angle of incidence. The gain of the cavity is also enhanced by applying anti-reflective coatings to the surfaces of the anisotropic element facing the optical paths within the linear cavity. A piezo-electric element or like device is attached to one of the mirrors to permit variation of the optical path length in the cavity and accordingly, vary the resonant frequency of the cavity.

The linewidth measurement technique of the present invention includes the steps of sweeping the dual frequency output beam from the above-described laser while maintaining a constant frequency separation and injecting the swept beam into a resonant cavity under study. The intensity of the output from the cavity is then measured with a detector and displayed on an oscilloscope showing the signal level against frequency. When the frequency separation of the input beam from the laser is approximately equal to one-half the cavity linewidth for the cavity under study, the oscilloscope display will show a pair of peaks of generally equal height which are not quite separate. A ratio between the heights of the two peaks and the height of the minima or dip joining the peaks together is then determined and compared to a curve to provide the cavity linewidth.

The novel features of the present invention will be better understood from the following detailed description, considered in connection with the accompanying drawing. It should be understood, however, that the drawings are for purposes of illustration and description only and are not intended as a definition of the limits of the present invention.

BEST MODE FOR CARRYING OUT THE INVENTION

Figure 1:
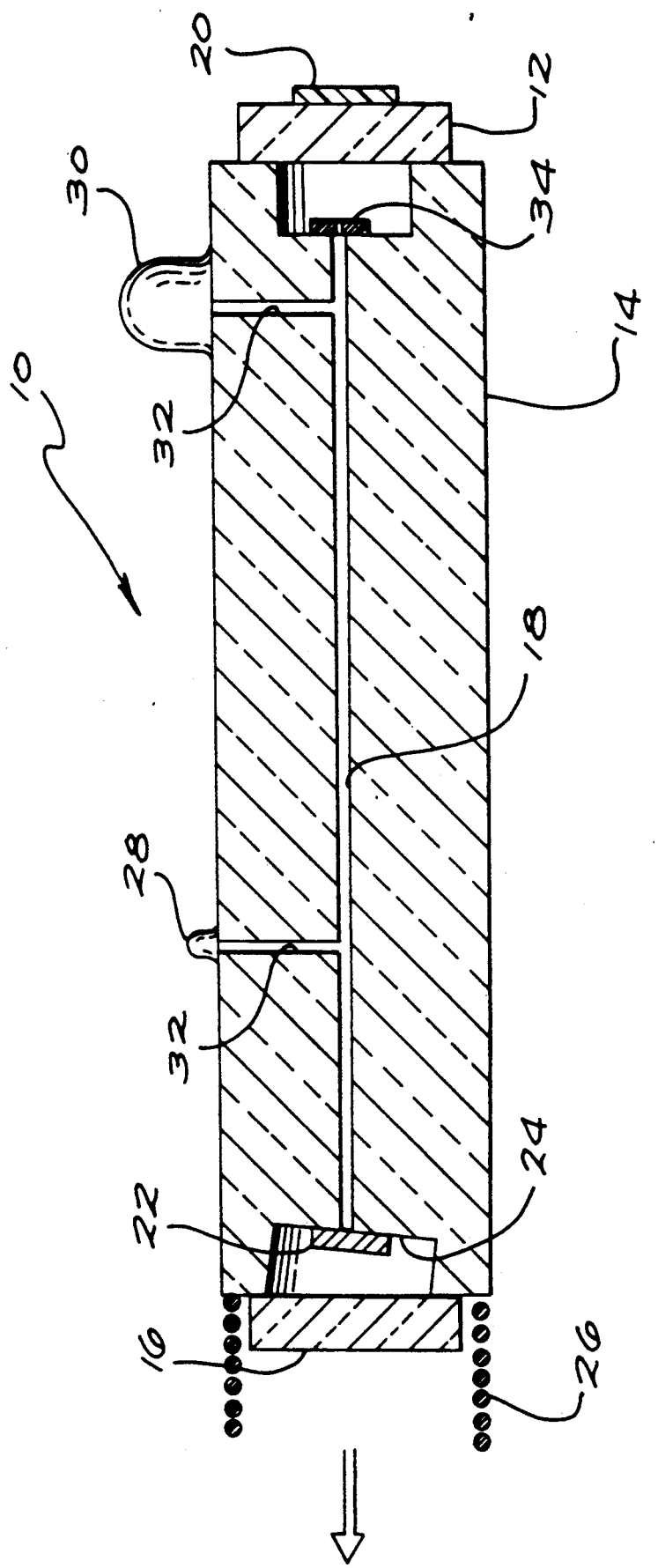
FIG. 1 is a schematic diagram of the dual frequency laser of the present invention.

Referring to the figures and, more particularly to FIG. 1, there is shown one preferred embodiment of the dual frequency laser apparatus 10 of the present invention. The laser 10 includes a linear resonant cavity formed between a fully reflective first mirror 12 attached to one end of a cavity block 14 and a partially reflective second mirror 16, mounted at an opposing end of the block 14. The mirrors 12 and 16 are parallel so as to define an optical path through a passageway 18 in the cavity block 14. A piezo-electric transducer 20 or like element is attached to the fully reflective mirror 12 in order to change the optical path length between the two mirrors 12 and 16, thus changing the resonant frequency of the cavity. A non-reciprocal element 22 is disposed in a counterbore 24 in an end-face of the block 14 adjacent the partially reflective mirror 16 and an electromagnetic coil 26 is attached to the end of the block 14 to provide a magnetic field at the non-reciprocal element 22. A presently preferred method of energizing the laser includes attaching a cathode 30 and an anode 28 to a side of the block 14, sealing bores 32 in the block which provide an electrical discharge path to the passageway 18. Lasing action is achieved by forming a plasma discharge in an appropriate gas media, as is well known in the laser art, within the passageway 18 and the bores 32.

In operation, a coherent light beam formed within the linear resonant cavity between the opposing mirrors 12 and 16 can be characterized as being made up of a left circularly polarized and a right circularly polarized beam. In the presence of a magnetic field, however, the non-reciprocal element 22 has been found to evidence a slightly different index of refraction for right and left circularly polarized beams. The optical path length between the two mirrors 12 and 16, and thus the resonant frequency of the linear resonant cavity, will therefore differ for the right and left circularly polarized beams due to this difference in the index of refraction of the element 22. Thus, the output of the laser, through the partially reflective mirror 16, forms a single coherent beam of light made up of right and left circularly polarized beams of two slightly different frequencies. This phenomena is referred to as a non-reciprocal frequency shift or, more generally, as non-reciprocal splitting. The separation ($\Delta f$) between these frequencies of left and right circularity polarized light is related to the magnetic field strength at the non-reciprocal element 22 and may be determined by the following equation:

$$\Delta f = \left( \frac{c}{\pi L} \right) V H t$$

Where, in this equation, t is the thickness of the non-reciprocal element 22, H is the spaced average of the magnetic field strength at the element 22, L is the distance between the opposing faces of the mirrors 12 and 16, c is the speed of light and V is the Verdet constant of the non-reciprocal element 22.

Depending on the range of wavelengths at which the laser operates, the non-reciprocal element 22 may be made from one of a variety of optical materials well-known in the art for inducing a non-reciprocal frequency shift in light beams of opposite circular polarization. Such optical materials are generally called Faraday rotators. If, for example, the lasing media has a coherent output in the visible range of the spectrum, fused silica quartz can be used as the element 22. Quartz, however, has a relatively low Verdet constant. A material sold under the trademark SF57 having a higher Verdet constant for light in the visible spectrum is available from Schott Glass of Duryea, Pa. In one presently preferred embodiment, a six-inch long helium-neon laser using an SF57 non-reciprocal element 22 forty thousandths of an inch thick can produce a frequency separation of 130 Khz between the two coherent frequencies in the output of the laser when the element 22 was subjected to a 100 gauss magnetic field.

The non-reciprocal element 22 may have any convenient configuration, such as a disk, positioned in the optical path between the mirrors 12 and 16. As shown in FIG. 1, the flat surfaces of the non-reciprocal element 22 are preferably oriented at a non-perpendicular angle to the optical path to avoid the formation of separate resonant cavities between the mirrors 12 and 16 and the faces of the element 22. An anti-reflecting coating is also applied to the faces of the element 22 to reduce losses within the cavity and thus enhance the gain of the laser 10. Anti-reflective coatings of this type are well known in the art.

To facilitate mounting the non-reciprocal element 22, the counterbore 24 may be formed in the cavity block 14 at a non-perpendicular angle to the longitudinal axis of the bore 18. The element 22 is then attached to the block 14 by any of a number of procedures known in the art, such as for example, indium bonding.

As shown in FIG. 1, the electromagnetic coil 26 is attached to an end of the laser block 14 near the non-reciprocal element 22. Placement of the electromagnetic coil 26 adjacent the end of the cavity block 14 subjects the non-reciprocal element 22 to the edge of the magnetic field generated by the coil 26. If desired, the coil 26 could also be positioned or, alternatively, lengthened so as to completely encircle the element 22 and thus provide a stronger solenoidal magnetic field about the element 22. The magnetic field about the rotator is far away from the gain region between 28 and 32 so that unwanted effects on the plasma region are minimized.

Permanent magnets (not shown) may also be appropriately disposed about the non-reciprocal element 22 to supplement the magnetic field produced by the coil 26. In applications other than resonant cavity linewidth measurements, the electromagnetic coil 26 may be replaced entirely by permanent magnets. The coil 26, however, causes the magnetic field strength at the non-reciprocal element 22 to be varied as the coil current varies, thus permitting control over the separation of the two output frequencies of the laser 10.

Figure 2:
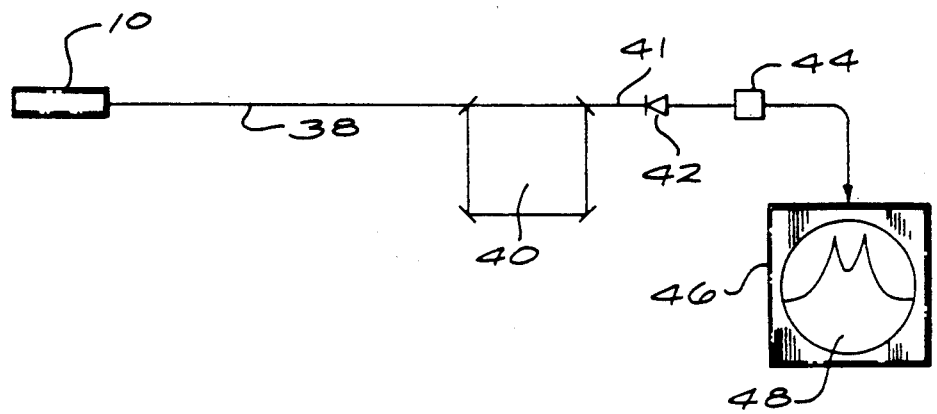
FIG. 2 is a schematic diagram of a suitable arrangement for measuring resonant cavity linewidths with the dual frequency laser of the present invention.

Referring to FIG. 2, there is shown an illustrative arrangement for measuring the linewidth of a cavity 40 under study with the laser 10 of the present invention. An output beam 38 from the laser 10 is injected into the cavity 40 with an output beam 41 from the cavity 40 measured by a detector 42. The signal from the detector 42 is then sent through a low-pass filter 44 and displayed on an oscilloscope 46 plotting detector signal level as a function of frequency to display a characteristically symmetric, double peak curve 48. The low-pass filter 44 eliminates an AC modulation envelope in the double peak curve 48 so that the display is less subject to movement or jitter and system noise. While the cavity 40 illustrated in FIG. 2 is a ring laser, it should be understood that the present linewidth measuring technique could be applied to any desired type of cavity including, for example, a linear laser cavity.

Figure 3:
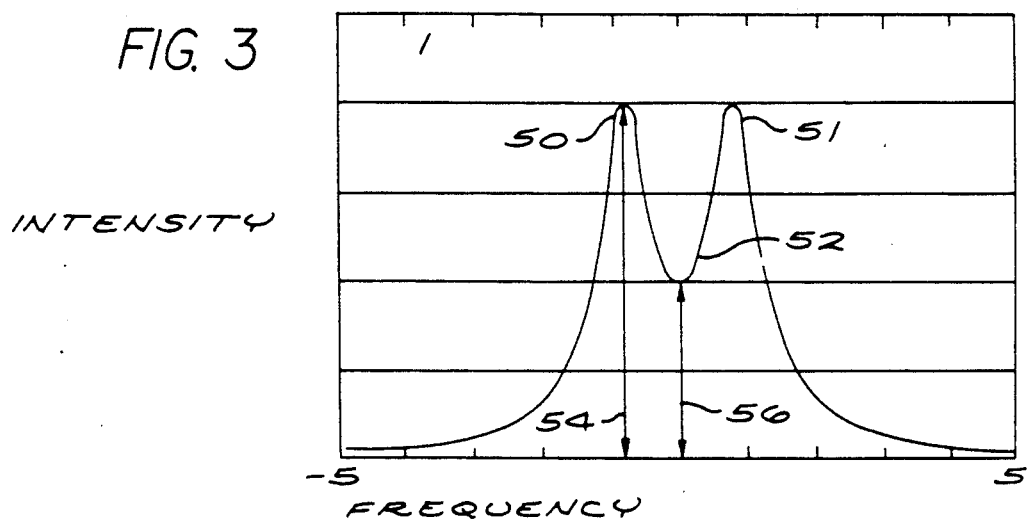
FIG. 3 is an oscilloscope display of the output from the cavity under study in FIG. 2.
Figure 4:
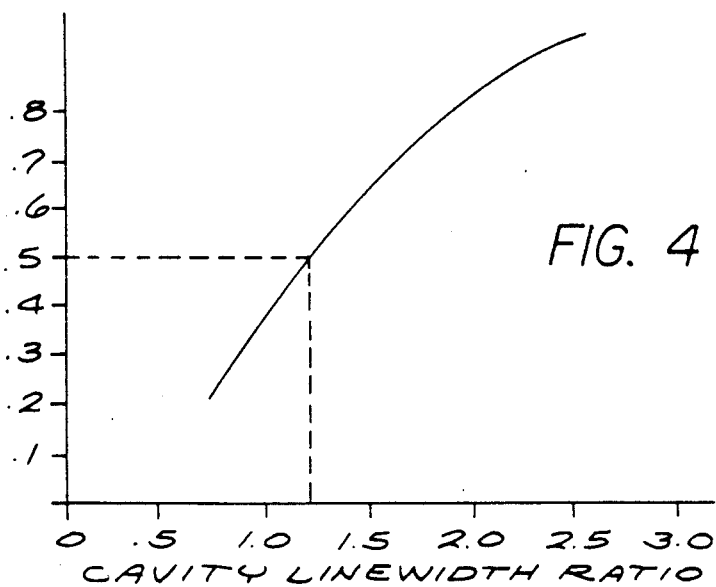
FIG. 4 is a curve used to determine cavity linewidth from measurements made of the display shown in FIG. 3.

Referring to FIG. 3, an oscilloscope display is illustrated in which the output of the dual frequency laser 10 is dithered or swept at a rate of about twenty to thirty hertz across a frequency range of about one gigahertz. This is accomplished in the laser 10 of the present invention by applying an AC signal to the piezo-electric element 20 attached to the fully reflective first mirror 12. The magnet field of the coil 26 is then varied so as to obtain a separation in the frequencies of the output beam 38 approximately equal to one-half the linewidth of the cavity 40 under study. When this frequency separation is achieved, the oscilloscope display will show two symmetric peaks 50 and 51 joined together at a dip 52. The linewidth of the cavity 40 under study can then be determined by measuring a ratio of the height 54 of one of the peaks 50 or 51 to the height 56 of the dip 52 between the peaks 50 and 51. This dip-to-peak ratio is then used in conjunction with the curve plotted in FIG. 4 to provide the cavity linewidth ratio of the cavity 40 under study. The linewidth of the cavity 40 is then equal to one-half of the frequency separation of the laser 10 multiplied by the ratio obtained from the graph in FIG. 4. The curve plotted in FIG. 4 represents the response curve of a resonant cavity responding to two input signals separately swept through the resonance frequency of the cavity. By way of example, the dip-to-peak ratio illustrated in FIG. 3 is one-half, yielding a ratio in FIG. 4 of 1.22. The linewidth of the cavity 40 generating the curve displayed in FIG. 3 would then be equal to one-half the frequency separation of the dual frequency output beam from the laser 10 times the ratio of 1.22.

The determination of cavity linewidths obtained by this double peak ratio measurement technique of the present invention is both reliable and highly reproducible. These results are generally more reproducible than the full width at half-maximum measurements obtained through conventional fast finesse techniques. Since the vertical height of the peaks 50 and 51 and the dip 52 are generally independent of the laser sweep at low-sweep frequencies, measurements of the relative vertical heights of the detector signal voltages in the present technique are more accurate than the horizontal measurements required by the conventional fast-finesse technique. Noise contributions from phase fluctuations, which affect the horizontal location of the peaks 50, 51 and the dip 52 also do not appear to affect the instantaneous size of the peaks and the dip to the first order. Thus, the present measurement technique, in conjunction with the above-described novel dual frequency output laser apparatus, provides a relatively simple and highly accurate technique and apparatus for measuring the linewidth of a cavity under study.

From the above discussion it is clear that the present invention provides a novel method and apparatus suitable for resonant cavity linewidth measurement. It will, of course, be understood that modifications to the above described dual frequency output laser apparatus and linewidth measurement technique will be apparent to others skilled in the art. For example, a variety of linear laser configurations could be employed in which a non-reciprocal element of appropriate composition is disposed within the resonant cavity of the laser to create a coherent dual frequency output. As mentioned above, selection of the lasing media and the non-reciprocal element are dependent upon the frequency range and separation desired of the laser output. Similarly, a variety of permanent and electrical magnet structures could be employed to achieve a desired frequency separation and permit variation of the frequency separation within desired ranges. Accordingly, the scope of the present invention is not limited by the particular embodiments or the description above, but is defined only by the claims set forth below and equivalents thereof.

What is claimed is:

1. A dual frequency coherent radiation source, comprising:
   a resonant cavity defining a linear optical axis;
   a faraday rotator, disposed within the resonant cavity;
   magnetic means for generating a magnetic field at the faraday rotator; and
   means for varying an optical path length within the resonant cavity, wherein the output of the resonant cavity simultaneously includes coherent radiation of two differing frequencies having a separation generally independent of a resonant frequency of the cavity and wherein the spacing between the differing frequencies remains generally constant as the cavity length is varied.

2. The dual frequency coherent radiation of claim 1, wherein said magnetic means includes a permanent magnet disposed proximate the faraday rotator.

3. The dual frequency coherent radiation source of claim 1, wherein said magnetic means includes means for varying the strength of the magnetic field at the faraday rotator.

4. The dual frequency coherent radiation source of claim 1, wherein the non-reciprocal element has a pair of generally flat opposing surfaces oriented at a non-perpendicular angle to said optical axis of the resonant cavity.

5. The dual frequency coherent radiation source of claim 1, wherein the generally flat opposing surfaces of the non-reciprocal element have anti-reflective coatings.

6. A linear laser having an output of two swept frequencies with controlled separation, comprising:
   a resonant cavity including a fully reflective first mirror and a partially reflective second mirror spaced apart from and oriented with respect to the first mirror so as to form an optical axis;
   a non-reciprocal element disposed within the resonant cavity;
   magnetic means for forming a magnetic field at the non-reciprocal element; and
   displacement means for varying the spacing between the first and second mirrors so as to vary the resonant frequency of the cavity, wherein the output of the laser includes two differing frequencies of coherent radiation having a separation generally independent of the resonant frequency of the cavity.

7. The laser of claim 6, wherein said magnetic means includes a permanent magnet.

8. The laser of claim 6, wherein said magnetic means includes means for varying the strength of the magnetic field at the non-reciprocal element.

9. The laser of claim 6, wherein the non-reciprocal element has a pair of generally flat opposing surfaces oriented at a non-perpendicular angle to said optical axis of the resonant cavity.

10. The laser of claim 9, wherein the generally flat opposing surfaces of the non-reciprocal element have anti-reflective coatings.

11. The dual frequency coherent radiation source of claim 1, wherein said magnetic means is an electromagnetic coil.

12. The laser of claim 6, wherein said magnetic means is an electromagnetic coil.

13. A laser having an output of two variable frequencies, comprising:
- a resonant cavity including a fully reflective first mirror and a partially reflective second mirror spaced apart from and oriented with respect to the first mirror so as to form an optical axis; and
- frequency control means for inducing non-reciprocal frequency splitting in a resonant frequency of said cavity and for varying the resonant frequency of said cavity while maintaining separation between the split frequencies, wherein the output of the laser simultaneously includes coherent radiation of two differing frequencies having a generally constant separation as the frequencies vary.

14. The laser of claim 13 wherein the frequency control means includes a faraday rotator.

15. The laser of claim 14 wherein the frequency control means includes means for generating a solenoidal magnetic field at said faraday rotator.

16. The laser of claim 13 wherein the frequency control means includes means for varying the resonant cavity length so as to vary the resonant frequency of the cavity.

* * * * *